(12) United States Patent
Tzeng

(10) Patent No.: US 11,699,964 B2
(45) Date of Patent: Jul. 11, 2023

(54) MOTOR CONTROLLER

(71) Applicant: Global Mixed-mode Technology Inc., Hsin-Chu (TW)

(72) Inventor: Guang-Nan Tzeng, Hsinchu (TW)

(73) Assignee: Global Mixed-mode Technology Inc., Hsin-Chu (TW)

( * ) Notice: Subject to any disclaimer, the term of this patent is extended or adjusted under 35 U.S.C. 154(b) by 0 days.

(21) Appl. No.: 17/409,790

(22) Filed: Aug. 23, 2021

(65) Prior Publication Data

US 2023/0058267 A1    Feb. 23, 2023

(51) Int. Cl.
*H02P 6/22* (2006.01)
*H02P 6/182* (2016.01)

(52) U.S. Cl.
CPC ............... *H02P 6/22* (2013.01); *H02P 6/182* (2013.01)

(58) Field of Classification Search
CPC ... H02P 6/16; H02P 7/28; H02P 27/06; H02K 11/33
See application file for complete search history.

(56) References Cited

U.S. PATENT DOCUMENTS

| 2010/0327788 | A1 | 12/2010 | Laulanet | |
|---|---|---|---|---|
| 2012/0043919 | A1* | 2/2012 | Lee | H02P 6/182 318/400.11 |
| 2018/0234042 | A1* | 8/2018 | Aoki | H02P 6/185 |
| 2020/0244207 | A1* | 7/2020 | Kaidu | H02P 25/22 |
| 2021/0050806 | A1* | 2/2021 | Chen | H02P 6/21 |

FOREIGN PATENT DOCUMENTS

| CN | 1949653 A | 4/2007 |
|---|---|---|
| CN | 112398380 A | 2/2021 |
| TW | 200713784 | 4/2007 |
| TW | 202107833 A | 2/2021 |
| TW | 202114340 A | 4/2021 |

* cited by examiner

Primary Examiner — Said Bouziane
(74) *Attorney, Agent, or Firm* — Winston Hsu

(57) ABSTRACT

A motor controller comprises a switch circuit and a control unit. The switch circuit is coupled to a motor for driving the motor. The control unit is configured to generate a plurality of control signals to control the switch circuit. The motor controller sequentially determines a first phase, a second phase, a third phase, and a fourth phase based on a rotation direction. When the motor controller is in the first phase and the motor controller is unable to detect a phase switching time point within a starting time, the motor controller switches from the first phase to the second phase, the third phase, or the fourth phase. The motor controller is configured to increase a success rate of starting the motor.

40 Claims, 1 Drawing Sheet

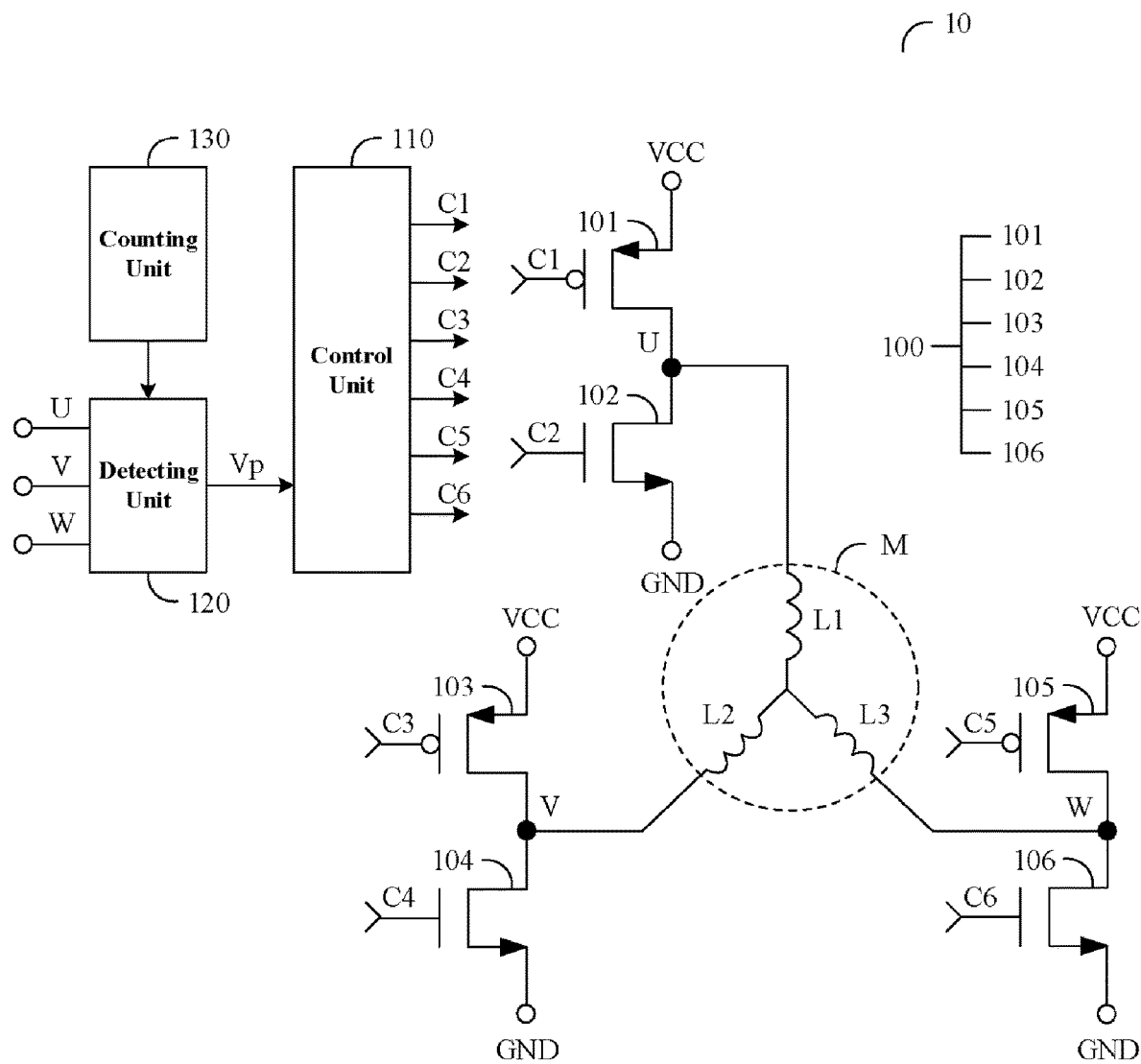

MOTOR CONTROLLER

BACKGROUND OF THE INVENTION

1. Field of the Invention

The present invention relates to a motor controller, and more particularly, to a motor controller which may be applied to a fan motor system.

2. Description of the Prior Art

Conventionally, there are two driving methods for driving a motor. The first driving method uses the Hall sensor for switching phases, so as to drive the motor. The second driving method does not use the Hall sensor to drive the motor. The Hall sensor is affected by the external environment easily, such that the detecting accuracy is decreased. Besides, the installation of the Hall sensor results in an increase of the volume and the cost of the system. Therefore, the sensorless driving method is provided for solving the above problems.

In the sensorless driving method, the motor controller may switch phases by detecting the back electromotive force of the floating phase. However, when the motor controller is in a starting state and the motor controller is unable to detect a phase switching time point within a starting time, a commutation mechanism is needed to switch phases. Thus, a new commutation mechanism is provided for increasing the success rate of starting the motor according to the present invention.

SUMMARY OF THE INVENTION

According to the present invention, a motor controller which is capable of increasing a success rate of starting a motor is provided. The motor controller comprises a switch circuit, a control unit, a detecting unit, and a counting unit. The switch circuit is coupled to the motor for driving the motor. The control unit is configured to generate a plurality of control signals to control the switch circuit. The detecting unit is coupled to the switch circuit for generating a phase signal to the control unit. The motor controller sequentially determines a first phase, a second phase, a third phase, and a fourth phase based on a rotation direction. When the motor controller is in the first phase and the motor controller is unable to detect a phase switching time point within a starting time, the motor controller switches from the first phase to the second phase, the third phase, or the fourth phase.

When an output load of the motor controller is a light load, the motor controller is in the first phase, and the motor controller is unable to detect the phase switching time point within the starting time, the motor controller switches from the first phase to the second phase. When an output load of the motor controller is a heavy load, the motor controller is in the first phase, and the motor controller is unable to detect the phase switching time point within the starting time, the motor controller switches from the first phase to the third phase. When the motor controller detects a reverse rotation state, the motor controller is in the first phase, and the motor controller is unable to detect the phase switching time point within the starting time, the motor controller switches from the first phase to the fourth phase. In order to execute a commutation mechanism more efficiently, there are at least two embodiments as follows:

1. The starting time is a fixed value. The designer may enable that the starting time is a larger value, thereby increasing the success rate of starting the motor. The counting unit is coupled to the detecting unit for computing the starting time. When the motor controller switches phases, the counting unit is reset.

2. The starting time is a non-fixed value. For example, the starting time at a previous time may be N times the starting time at a current time, where N is greater than 0. According to a preferred embodiment of the present invention, N may be greater than 1. For example, N may be equal to 2. The counting unit is coupled to the detecting unit for computing the starting time at the previous time and the starting time at the current time. When the motor controller switches phases, the counting unit is reset.

These and other objectives of the present invention will no doubt become obvious to those of ordinary skill in the art after reading the following detailed description of the preferred embodiment that is illustrated in the various FIGURES and drawings.

BRIEF DESCRIPTION OF THE DRAWINGS

The above-mentioned and other objects, features, and advantages of the present invention will become apparent with reference to the following descriptions and the accompanying drawing, wherein:

FIG. 1 is a schematic diagram showing a motor controller according to one embodiment of the present invention.

DETAILED DESCRIPTION

Preferred embodiments according to the present invention will be described in detail with reference to the drawing.

FIG. 1 is a schematic diagram showing a motor controller 10 according to one embodiment of the present invention. The motor controller 10 is used for driving a motor M, where the motor M may be a three-phase motor. The motor M has a first coil L1, a second coil L2, and a third coil L3. The motor controller 10 may be applied to a fan motor system. The motor controller 10 comprises a switch circuit 100, a control unit 110, a detecting unit 120, and a counting unit 130. The switch circuit 100 includes a first transistor 101, a second transistor 102, a third transistor 103, a fourth transistor 104, a fifth transistor 105, a sixth transistor 106, a first terminal U, a second terminal V, and a third terminal W, where the switch circuit 100 is coupled to the motor M for driving the motor M. The first transistor 101 is coupled to a fourth terminal VCC and the first terminal U while the second transistor 102 is coupled to the first terminal U and a fifth terminal GND. The third transistor 103 is coupled to the fourth terminal VCC and the second terminal V while the fourth transistor 104 is coupled to the second terminal V and the fifth terminal GND. The fifth transistor 105 is coupled to the fourth terminal VCC and the third terminal W while the sixth transistor 106 is coupled to the third terminal W and the fifth terminal GND. Each of the first transistor 101, the third transistor 103, and the fifth transistor 105 may be a p-type MOSFET. Each of the second transistor 102, the fourth transistor 104, and the sixth transistor 106 may be an n-type MOSFET.

One terminal of the first coil L1 is coupled to the first terminal U. One terminal of the second coil L2 is coupled to the second terminal V. One terminal of the third coil L3 is coupled to the third terminal W. Furthermore, another terminal of the first coil L1 is coupled to another terminal of the second coil L2 and another terminal of the third coil L3. That is to say, the first coil L1, the second coil L2, and the third coil L3 form a Y-shaped configuration. The control unit 110 generates a first control signal C1, a second control signal C2, a third control signal C3, a fourth control signal C4, a fifth control signal C5, and a sixth control signal C6 for respectively controlling the ON/OFF states of the first transistor 101, the second transistor 102, the third transistor 103, the fourth transistor 104, the fifth transistor 105, and the sixth transistor 106. The detecting unit 120 is coupled to the first terminal U, the second terminal V, and the third terminal W for generating a phase signal Vp to the control unit 110. The detecting unit 120 may be used for detecting a back electromotive force of a floating phase.

The control unit 110 may respectively generate a first voltage vector, a second voltage vector, a third voltage vector, a fourth voltage vector, a fifth voltage vector, and a sixth voltage vector to the switch circuit 100 for activating two of the first coil L1, the second coil L2, and the third coil L3. When the control unit 110 generates the first voltage vector to the switch circuit 100, the control unit 110 turns on the first transistor 101 and the fourth transistor 104 and turns off the second transistor 102, the third transistor 103, the fifth transistor 105, and the sixth transistor 106 for activating the first coil L1 and the second coil L2. At this moment the floating phase is formed in the third coil L3. When the control unit 110 generates the second voltage vector to the switch circuit 100, the control unit 110 turns on the first transistor 101 and the sixth transistor 106 and turns off the second transistor 102, the third transistor 103, the fourth transistor 104, and the fifth transistor 105 for activating the first coil L1 and the third coil L3. At this moment the floating phase is formed in the second coil L2. When the control unit 110 generates the third voltage vector to the switch circuit 100, the control unit 110 turns on the third transistor 103 and the sixth transistor 106 and turns off the first transistor 101, the second transistor 102, the fourth transistor 104, and the fifth transistor 105 for activating the second coil L2 and the third coil L3. At this moment the floating phase is formed in the first coil L1. When the control unit 110 generates the fourth voltage vector to the switch circuit 100, the control unit 110 turns on the second transistor 102 and the third transistor 103 and turns off the first transistor 101, the fourth transistor 104, the fifth transistor 105, and the sixth transistor 106 for activating the second coil L2 and the first coil L1. At this moment the floating phase is formed in the third coil L3. When the control unit 110 generates the fifth voltage vector to the switch circuit 100, the control unit 110 turns on the second transistor 102 and the fifth transistor 105 and turns off the first transistor 101, the third transistor 103, the fourth transistor 104, and the sixth transistor 106 for activating the third coil L3 and the first coil L1. At this moment the floating phase is formed in the second coil L2. When the control unit 110 generates the sixth voltage vector to the switch circuit 100, the control unit 110 turns on the fourth transistor 104 and the fifth transistor 105 and turns off the first transistor 101, the second transistor 102, the third transistor 103, and the sixth transistor 106 for activating the third coil L3 and the second coil L2. At this moment the floating phase is formed in the first coil L1. Consequently, when the control unit 110 switches phases based on the sequence of the first voltage vector, the second voltage vector, the third voltage vector, the fourth voltage vector, the fifth voltage vector, and the sixth voltage vector, the motor M is driven for one cycle forwardly. When the control unit 110 switches phases based on the sequence of the sixth voltage vector, the fifth voltage vector, the fourth voltage vector, the third voltage vector, the second voltage vector, and the first voltage vector, the motor M is driven for one cycle reversely.

More specifically, the motor controller 10 may sequentially determine a first phase, a second phase, a third phase, a fourth phase, a fifth phase, and a sixth phase based on a rotation direction. The rotation direction may be a forward rotation direction or a reverse rotation direction. In order to increase the success rate of starting the motor M, the motor controller 10 may be designed to be capable of completing a starting procedure under different output loads. When the motor controller 10 is in the first phase and the motor controller 10 is unable to detect a phase switching time point within a starting time, the motor controller 10 may switch from the first phase to the second phase, the third phase, or the fourth phase. For example, when the motor controller 10 is in the first phase and the motor controller 10 is unable to detect the phase switching time point within the starting time, if the output load of the motor controller 10 is a light load, the motor controller 10 may switch from the first phase to the second phase for generating a smaller acceleration. The weight of the output load may be used to determine whether or not the output load is the light load. When the motor controller 10 is in the first phase and the motor controller 10 is unable to detect the phase switching time point within the starting time, if the output load of the motor controller 10 is a heavy load, the motor controller 10 may switch from the first phase to the third phase for generating a larger acceleration. The weight of the output load may be used to determine whether or not the output load is the heavy load. When the motor controller 10 is in the first phase and the motor controller 10 is unable to detect the phase switching time point within the starting time, if the motor controller 10 detects a reverse rotation state, the motor controller 10 may switch from the first phase to the fourth phase. Moreover, the motor controller 10 may obtain the phase switching time point by detecting the back electromotive force of the floating phase. For example, when the back electromotive force of the floating phase is greater than a first voltage or less than a second voltage, the detecting unit 120 may output the phase signal Vp for informing the control unit 110 to switch phases. The motor controller 10 may detect the phase switching time point by a hysteresis comparator. According to a preferred embodiment of the present invention, the starting time may be in the range of 1 millisecond to 1,000 milliseconds. The motor controller 10 may utilize a six-step square wave driving mechanism and the starting time to switch phases. In order to execute a commutation mechanism more efficiently, there are at least two embodiments as follows:

1. The starting time is a fixed value. The designer may enable that the starting time is a larger value, thereby increasing the success rate of starting the motor M. The counting unit 130 is coupled to the detecting unit 120 for computing the starting time. When the motor controller 10 switches phases, the counting unit 130 is reset. At this moment the counting unit 130 recounts for re-computing the starting time.

2. The starting time is a non-fixed value. For example, the starting time at a previous time may be N times the starting time at a current time, where N is greater than 0. According to a preferred embodiment of the present invention, N may be greater than 1. For example, N may be equal to 2. The counting unit 130 is coupled to the detecting unit 120 for computing the starting time at the previous time and the starting time at the current time. When the motor controller 10 switches phases, the counting unit 130 is reset. The motor controller 10 may utilize the non-fixed starting time for completing the starting procedure, such that the detection of the phase switching time point becomes easier.

According to one embodiment of the present invention, the motor controller 10 may be applied to a sensorless motor system, a DC motor system, and a brushless motor system. When the motor controller 10 is in the first phase and the motor controller 10 is unable to detect a phase switching time point within a starting time, the motor controller 10 may switch from the first phase to the second phase, the third phase, or the fourth phase. By means of a new commutation mechanism, the motor controller 10 may be configured to increase the success rate of starting the motor M. Furthermore, the motor controller 10 may be applied to a fan motor system.

While the present invention has been described by the preferred embodiment, it is to be understood that the invention is not limited to the disclosed embodiment. On the contrary, it is intended to cover various modifications. Therefore, the scope of the appended claims should be accorded the broadest interpretation so as to encompass all such modifications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motor controller comprising:
   a switch circuit, coupled to a motor for driving the motor; and
   a control unit, configured to generate a plurality of control signals to control the switch circuit, wherein the motor controller sequentially determines a first phase, a second phase, a third phase, and a fourth phase based on a rotation direction, when the motor controller is in the first phase and the motor controller is unable to detect a phase switching time point within a starting time, the motor controller switches from the first phase to the second phase, the third phase, or the fourth phase, and the starting time is in the range of 1 millisecond to 1,000 milliseconds.

2. The motor controller of claim 1, wherein when an output load of the motor controller is a light load, the motor controller is in the first phase, and the motor controller is unable to detect the phase switching time point within the starting time, the motor controller switches from the first phase to the second phase.

3. The motor controller of claim 2, wherein a weight of the output load is used to determine whether or not the output load is the light load.

4. The motor controller of claim 1, wherein when an output load of the motor controller is a heavy load, the motor controller is in the first phase, and the motor controller is unable to detect the phase switching time point within the starting time, the motor controller switches from the first phase to the third phase.

5. The motor controller of claim 4, wherein a weight of the output load is used to determine whether or not the output load is the heavy load.

6. The motor controller of claim 1, wherein when the motor controller detects a reverse rotation state, the motor controller is in the first phase, and the motor controller is unable to detect the phase switching time point within the starting time, the motor controller switches from the first phase to the fourth phase.

7. The motor controller of claim 1, wherein the motor controller is configured to increase a success rate of starting the motor.

8. The motor controller of claim 1, wherein the switch circuit comprises a first terminal, a second terminal, and a third terminal, the motor controller further comprises a detecting unit, and the detecting unit is coupled to the first terminal, the second terminal, and the third terminal for generating a phase signal to the control unit.

9. The motor controller of claim 8, wherein the switch circuit further comprises:
   a first transistor, coupled to a fourth terminal and the first terminal;
   a second transistor, coupled to the first terminal and a fifth terminal;
   a third transistor, coupled to the fourth terminal and the second terminal;
   a fourth transistor, coupled to the second terminal and the fifth terminal;
   a fifth transistor, coupled to the fourth terminal and the third terminal; and
   a sixth transistor, coupled to the third terminal and the fifth terminal.

10. The motor controller of claim 8, wherein the motor controller further comprises a counting unit, and the counting unit is coupled to the detecting unit for computing the starting time.

11. The motor controller of claim 10, wherein when the motor controller switches phases, the counting unit is reset.

12. The motor controller of claim 1, wherein the rotation direction is a forward rotation direction.

13. The motor controller of claim 1, wherein the rotation direction is a reverse rotation direction.

14. The motor controller of claim 1, wherein the starting time is a fixed value.

15. The motor controller of claim 1, wherein the starting time is a non-fixed value.

16. The motor controller of claim 1, wherein the starting time at a previous time is N times the starting time at a current time, and N is greater than 0.

17. The motor controller of claim 16, wherein the motor controller further comprises a counting unit, and the counting unit is configured to compute the starting time at the previous time and the starting time at the current time.

18. The motor controller of claim 1, wherein the starting time at a previous time is N times the starting time at a current time, and N is greater than 1.

19. The motor controller of claim 1, wherein the motor controller utilizes a six-step square wave driving mechanism and the starting time to switch phases.

20. The motor controller of claim 1, wherein the motor controller obtains the phase switching time point by detecting a back electromotive force of a floating phase.

21. The motor controller of claim 1, wherein the motor controller further comprises a detecting unit, and when a back electromotive force of a floating phase is greater than a first voltage or less than a second voltage, the detecting unit outputs a phase signal for informing the control unit to switch phases.

22. The motor controller of claim 1, wherein the motor controller detects the phase switching time point by a hysteresis comparator.

23. The motor controller of claim 1, wherein the motor controller is applied to a fan motor system.

24. The motor controller of claim 1, wherein the motor controller is applied to a DC motor system.

25. The motor controller of claim 1, wherein the motor controller is applied to a brushless motor system.

26. A motor controller comprising:
 a switch circuit, coupled to a motor for driving the motor;
 a control unit, configured to generate a plurality of control signals to control the switch circuit;
 a detecting unit, coupled to the switch circuit for generating a phase signal to the control unit; and
 a counting unit, wherein the motor controller sequentially determines a first phase, a second phase, a third phase, and a fourth phase based on a rotation direction, when the motor controller is in the first phase and the motor controller is unable to detect a phase switching time point within a starting time, the motor controller switches from the first phase to the second phase, the counting unit is coupled to the detecting unit for computing the starting time, and the starting time is in the range of 1 millisecond to 1,000 milliseconds.

27. The motor controller of claim 26, wherein when the motor controller switches phases, the counting unit is reset.

28. The motor controller of claim 26, wherein the starting time is a fixed value.

29. The motor controller of claim 26, wherein the starting time is a non-fixed value.

30. The motor controller of claim 26, wherein the motor controller utilizes a six-step square wave driving mechanism and the starting time to switch phases.

31. A motor controller comprising:
 a switch circuit, coupled to a motor for driving the motor;
 a control unit, configured to generate a plurality of control signals to control the switch circuit;
 a detecting unit, coupled to the switch circuit for generating a phase signal to the control unit; and
 a counting unit, wherein the motor controller sequentially determines a first phase, a second phase, a third phase, and a fourth phase based on a rotation direction, when the motor controller is in the first phase and the motor controller is unable to detect a phase switching time point within a starting time, the motor controller switches from the first phase to the third phase, the counting unit is coupled to the detecting unit for computing the starting time, and the starting time is in the range of 1 millisecond to 1,000 milliseconds.

32. The motor controller of claim 31, wherein when the motor controller switches phases, the counting unit is reset.

33. The motor controller of claim 31, wherein the starting time is a fixed value.

34. The motor controller of claim 31, wherein the starting time is a non-fixed value.

35. The motor controller of claim 31, wherein the motor controller utilizes a six-step square wave driving mechanism and the starting time to switch phases.

36. A motor controller comprising:
 a switch circuit, coupled to a motor for driving the motor;
 a control unit, configured to generate a plurality of control signals to control the switch circuit;
 a detecting unit, coupled to the switch circuit for generating a phase signal to the control unit; and
 a counting unit, wherein the motor controller sequentially determines a first phase, a second phase, a third phase, and a fourth phase based on a rotation direction, when the motor controller is in the first phase and the motor controller is unable to detect a phase switching time point within a starting time, the motor controller switches from the first phase to the fourth phase, the counting unit is coupled to the detecting unit for computing the starting time, and the starting time is in the range of 1 millisecond to 1,000 milliseconds.

37. The motor controller of claim 36, wherein when the motor controller switches phases, the counting unit is reset.

38. The motor controller of claim 36, wherein the starting time is a fixed value.

39. The motor controller of claim 36, wherein the starting time is a non-fixed value.

40. The motor controller of claim 36, wherein the motor controller utilizes a six-step square wave driving mechanism and the starting time to switch phases.

* * * * *